United States Patent
Yamaguchi et al.

(10) Patent No.: US 8,708,387 B2
(45) Date of Patent: Apr. 29, 2014

(54) CONSOLE BOX

(71) Applicant: Suzuki Motor Corporation, Hamamatsu (JP)

(72) Inventors: Masato Yamaguchi, Hamamatsu (JP); Akinori Ishikawa, Hamamatsu (JP)

(73) Assignee: Suzuki Motor Corporation, Hamamatsu (JP)

( * ) Notice: Subject to any disclaimer, the term of this patent is extended or adjusted under 35 U.S.C. 154(b) by 0 days.

(21) Appl. No.: 13/963,585

(22) Filed: Aug. 9, 2013

(65) Prior Publication Data

US 2014/0049063 A1 Feb. 20, 2014

(30) Foreign Application Priority Data

Aug. 20, 2012 (JP) .................. 2012-181530

(51) Int. Cl.
*B60R 7/04* (2006.01)
(52) U.S. Cl.
USPC ...................................... 296/24.34
(58) Field of Classification Search
USPC .................. 296/24.34, 37.8, 37.14
See application file for complete search history.

(56) References Cited

U.S. PATENT DOCUMENTS

| | | | | |
|---|---|---|---|---|
| 5,106,143 A | * | 4/1992 | Soeters | 296/37.8 |
| 7,367,602 B1 | * | 5/2008 | Gidcumb et al. | 296/24.34 |
| 7,513,550 B1 | * | 4/2009 | Abro et al. | 296/24.34 |
| 7,658,357 B2 | * | 2/2010 | Babian | 296/24.34 |
| 2005/0116488 A1 | * | 6/2005 | Sakakibara | 296/37.8 |
| 2005/0132768 A1 | * | 6/2005 | Furuya | 70/422 |
| 2011/0018297 A1 | * | 1/2011 | Chheang et al. | 296/24.34 |
| 2011/0088960 A1 | * | 4/2011 | Hisazumi et al. | 180/271 |
| 2013/0057010 A1 | * | 3/2013 | Vasko et al. | 296/24.34 |
| 2013/0300144 A1 | * | 11/2013 | Rose, Benjamin | 296/24.34 |

FOREIGN PATENT DOCUMENTS

| | | | |
|---|---|---|---|
| JP | 11-151982 A | * | 6/1999 |
| JP | 2008-189016 A | * | 8/2008 |
| JP | 2010-012967 A | * | 1/2010 |
| JP | 2010-030555 | | 2/2010 |

* cited by examiner

*Primary Examiner* — Jason S Morrow

(74) *Attorney, Agent, or Firm* — Silicon Valley Patent Group LLP

(57) ABSTRACT

A console box is made of resin, is elongate in the vehicle front-rear direction, and can be installed on a floor panel. An upper component forms a top face and a front wall on the vehicle front side, and has, in the top face near the front wall, a drink holder that is recessed downward. A lower component forms side walls and on both sides in the vehicle width direction and a rear wall on the vehicle rear side. The lower component has a link portion that extends between and links the inner faces of the side walls and below the drink holder. The link portion is fixed with bolts and to the floor panel, and a lower face at a bottom of the drink holder has a clip that connects the drink holder to the link portion.

3 Claims, 5 Drawing Sheets

CROSS-SECTION A-A

CROSS-SECTION A-A

ARROW B VIEW

CONSOLE BOX

CROSS-REFERENCE TO RELATED APPLICATION

This application claims the benefit of and priority to Japanese Application No. 2012-181530 filed on Aug. 20, 2012 and entitled "Console box", which is assigned to the assignee hereof and which is incorporated herein by reference.

FIELD

This disclosure relates to console boxes installed on a floor panel between the front seats of a vehicle, for example.

BACKGROUND

A console box installed in a vehicle functions as a decorative member for covering an installation location of a brake lever and as a storage member for small items. Furthermore, a console box may be used as an installation location of operation switches for an air conditioner, power windows, and the like. Many console boxes are mainly made of synthetic resin. For example, Japanese Patent laid-open Publication No. 2010-30555 describes a rear console installed in the vicinity of the rear seats, as a type of console box. This rear console is also a member for storing small items, and is made of resin.

A console box is a portion to which loads tend to be applied on a daily basis. For example, when taking small items out of or putting them into a console box, or when changing the posture inside a vehicle compartment, an occupant may support his or her body by placing the hand on the console box. Such a console box has to be properly rigid so as not to be deformed in these cases. Meanwhile, like other constituent components in the vehicle, the console box is also required to be lighter and to have a simpler shape, and, thus, the rigidity has to be ensured in such a way that the lighter weight and the like can be also achieved.

Here, the shape of an ordinary mold that can be used for resin is limited depending on the molding direction (the pulling out direction) at the time of molding. For example, a console box may be configured such that the container portion for small items is recessed downward, and, thus, in order to realize this shape, the pulling out direction is often set along the vertical direction of the console box. In many cases, such a console box for which the pulling out direction has been set to the vertical direction is not produced by monolithic molding in one piece, but is produced by separately molding an upper component including the container portion and a lower component including the remaining portions such as side walls, and is installed with these portions combined.

As the container portion, for example, a drink holder or the like is provided particularly on the vehicle front side on a top face or the like. It is highly possible that an occupant places his or her hand on the vicinity of the container portion. If the molding is performed separately for the upper component and the lower component as described above, the load from the occupant may be generated in a direction that would rotate the upper component, taking the vicinity of the container portion of the upper component as the point of effort and the point connecting the upper component and the lower component as the fulcrum. Loads in such a direction easily cause a defective appearance such as generating a gap at the joint between the upper component and the lower component.

The present invention has been made in view of such a problem. It is an object of the present invention to provide a console box that can be kept in a good appearance by preventing, with a simple structure, deformation due to loads from an occupant.

SUMMARY OF THE DISCLOSURE

To achieve the object, a console box having a representative configuration according to the present invention is a console box that can be installed on a floor panel of a vehicle, that is made of resin, and that is elongate in a vehicle front-rear direction, including: an upper component forming a top face and a front wall on the vehicle front side, and having, in the top face near the front wall, a container portion that is recessed downward; and a lower component forming side walls on both sides in a vehicle width direction and a rear wall on the vehicle rear side; wherein the lower component has a link portion that extends between and links inner faces of the side walls below the container portion, the link portion has a first fixing portion that fixes the link portion to the floor panel, and a lower face at a bottom of the container portion has a connecting portion that connects the container portion to the link portion.

This console box has a link portion that links the side walls of the lower component for reinforcement such that a gap is not generated at the joint between the upper component and the lower component even when an occupant places his or her hand on the upper component after installation of the console box. Furthermore, the link portion is fixed by the first fixing portion to the floor panel, and the container portion of the upper component is connected by the connecting portion to this link portion. Examples of the first fixing portion include bolts and clips, and examples of the connecting portion also include clips. This configuration can improve the rigidity of the console box against loads, and, thus, a defective appearance such as deformation can be prevented.

Moreover, to achieve the object, a console box having another representative configuration according to the present invention is a console box that can be installed on a floor panel of a vehicle, that is made of resin, and that is elongate in a vehicle front-rear direction, including: an upper component forming a top face and a front wall on the vehicle front side, and having, in the top face near the front wall, a container portion that is recessed downward; and a lower component forming side walls on both sides in a vehicle width direction and a rear wall on the vehicle rear side; wherein the lower component has a link portion that extends between and links inner faces of the side walls, and at least a part of the link portion is in contact with a side portion of the container portion, and the link portion has a first fixing portion that fixes the link portion to the floor panel.

The thus configured link portion is also fixed by the first fixing portion, typical examples of which include bolts and clips, to the floor panel. This link portion not only links the side walls for reinforcement, but also is in contact with and supports the side portion of the container portion. Accordingly, even when loads are applied to the upper component, the link portion presses the container portion, thereby preventing the upper component from being moved. This configuration can also improve the rigidity of the console box against loads, and, thus, a defective appearance such as deformation can be prevented.

Moreover, it is preferable that the lower component further has a second fixing portion that fixes the lower component to the floor panel at a position lower than the link portion, whereby it is possible to install the console box on the floor panel, over a location in which height differs between the front and the rear in the vehicle and in which a rear region is lower than a front region. Examples of the second fixing portion include bolts, clips, and catch structures. If the console box is installed in a location having a difference in height, the attachment rigidity is improved especially against loads in a direction that would rotate the console box as described above, compared with the case in which the console box is installed in a flat location.

According to the above-described configuration, it is possible to provide a console box that can be kept in a good appearance by preventing deformation due to loads from an occupant.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

First Embodiment

Figure 1:
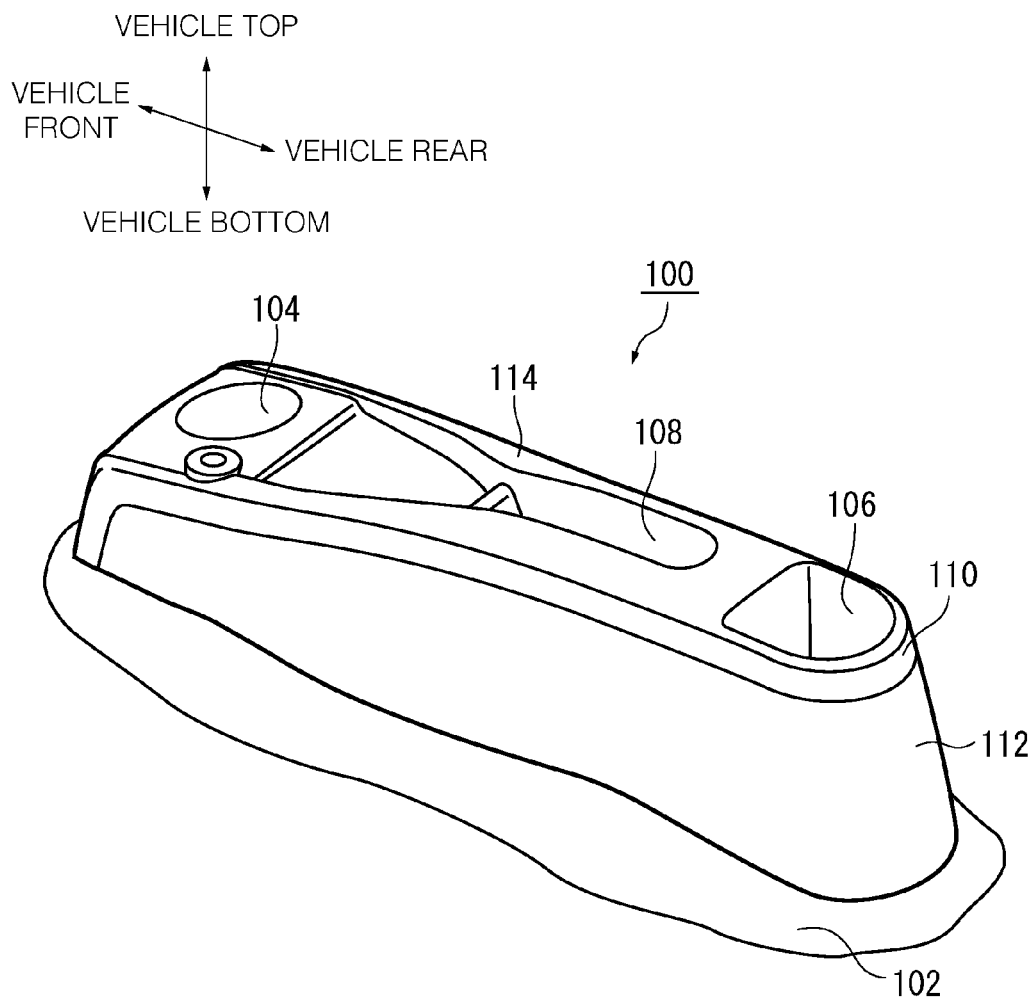
FIG. 1 is a view showing a console box according to a first embodiment of the present invention.

FIG. 1 is a view showing a console box 100 according to a first embodiment of the present invention. The console box 100 is elongate in the vehicle front-rear direction, and can be installed on a floor panel 102 between the driver's seat and the co-driver's seat (not shown). The console box 100 is provided with a plurality of container portions for storing small items. For example, a drink holder 104 is provided near the front wall on the vehicle front side, and a small item storage 106 is formed on the vehicle rear side. In addition to the container portions, a gate 108 for passing a brake lever is formed in the middle as a cut-out portion in the shape of an elongated hole.

Figure 2:
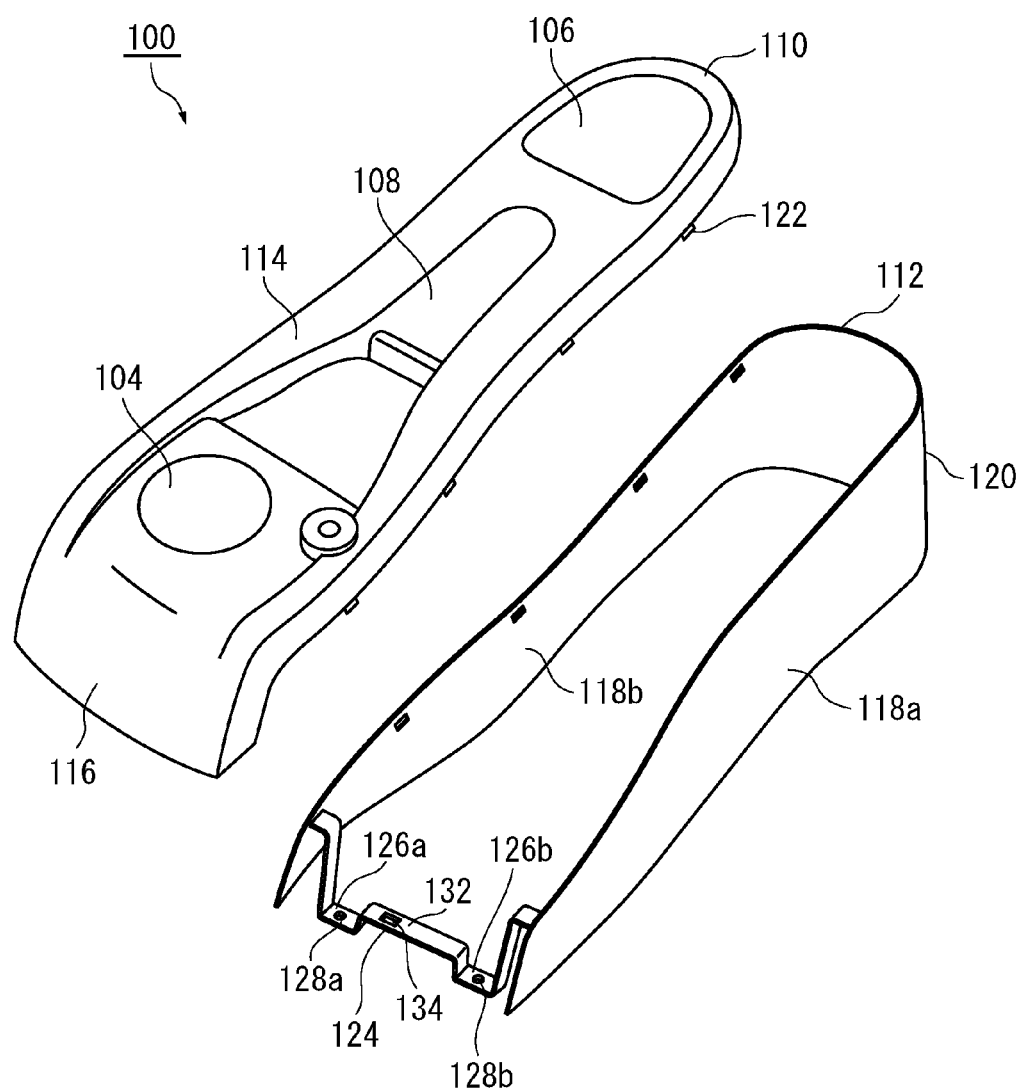
FIG. 2 is an exploded view of the console box in FIG. 1.

FIG. 2 is an exploded view of the console box 100 in FIG. 1. The console box 100 is made of resin, and is produced by separately molding two constituent components consisting of an upper component 110 and a lower component 112. The upper component 110 constitutes a top face 114 and a front wall 116 on the vehicle front side. The top face 114 is provided with the drink holder 104, the small item storage 106, and the gate 108 described above. The lower component 112 constitutes side walls 118a and 118b on both sides in the vehicle width direction and a rear wall 120 on the vehicle rear side. The lower component 112 is shaped such that, when being combined with the upper component 110, a space for accommodating wires of the brake lever and the like can be formed inside. Note that the upper component 110 has, on its edge, catches 122 or the like with which the upper component 110 is connected to the lower component 112.

Since the drink holder 104 and the small item storage 106 are recessed downward, in order to realize this shape by molding, the molding direction (the pulling out direction) when molding the upper component 110 is set along the vertical direction of the console box 100. Furthermore, the pulling out direction of the lower component 112 is also set along the vertical direction.

Shapes of both the upper component 110 and the lower component 112 are set such that molding can be easily performed considering the fact that the pulling out direction is the vertical direction. As a result, the lower component 112 has a shape that is open on the vehicle front side. With this shape, the molding can be easily performed, but the rigidity may be lowered. Accordingly, it is conceivable to provide a reinforcing structure, but the realizable shape is limited because the pulling out direction is the vertical direction. Furthermore, simply providing an additional constituent component as the reinforcing structure is not effective in terms of the weight and the cost.

Thus, in this embodiment, the lower component 112 is provided with a link portion 124 as the reinforcing structure. The link portion 124 extends between and links the inner faces of the side walls 118a and 118b on the vehicle front side in the lower component 112. With the link portion 124, deformation such as moving the side walls 118a and 118b away from each other can be prevented. In particular, after installation of the console box 100, when an occupant places his or her hand on the vicinity of the drink holder 104, the load is generated in a direction that would rotate the upper component 110 taking the vicinity of the drink holder 104 as the point of effort and the catches 122 or the like as the fulcrum. However, if the link portion 124 is provided, the load in that direction can be absorbed, and a gap is not generated at the boundary between the upper component 110 and the lower component 112, in particular, at the vertical boundaries between the front ends of the side walls 118a and 118b and the upper component 110, so that the console box can be kept in a good appearance.

Figure 3A:
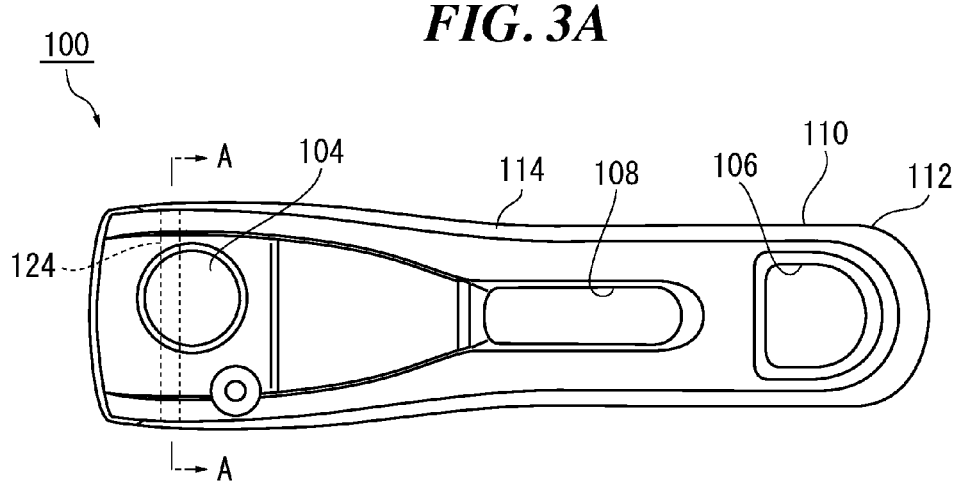
FIGS. 3A and 3B show views of a link portion in FIG. 2 from various directions.
Figure 3B:
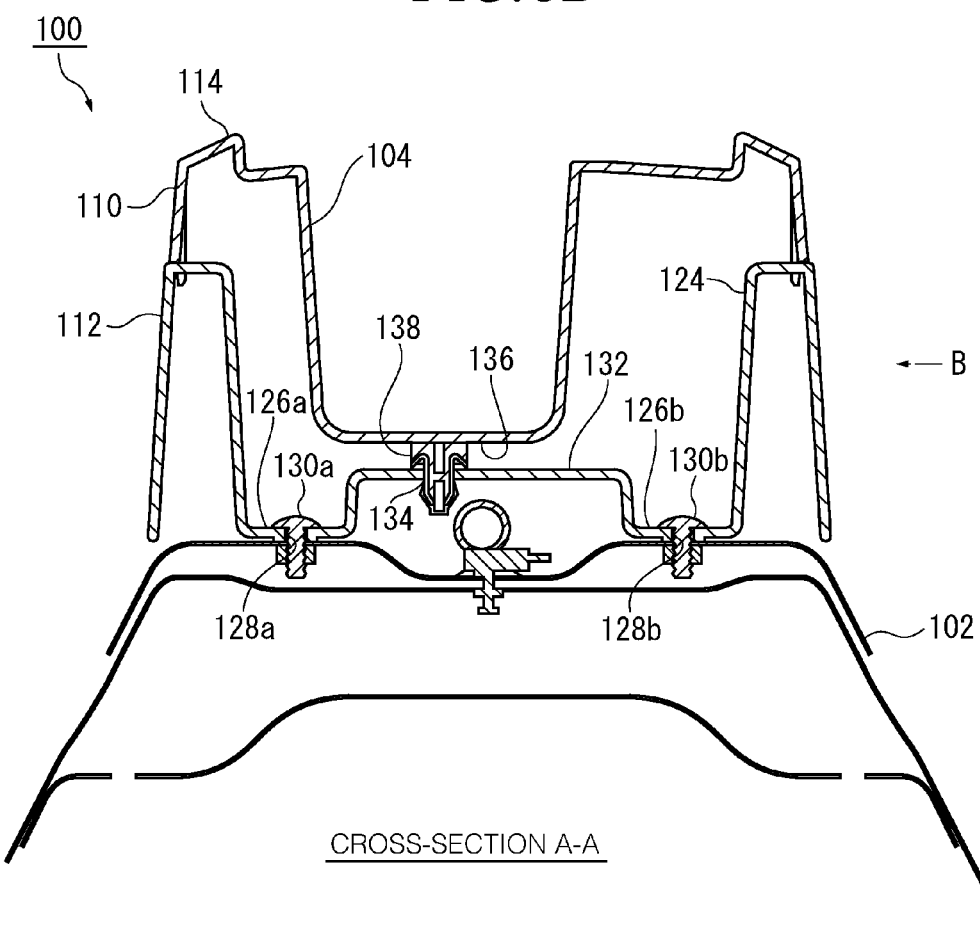

FIGS. 3A and 3B show views of the link portion 124 in FIG. 2 from various directions. FIG. 3A is a view showing the console box 100 from above. As indicated by the broken lines, the link portion 124 is provided so as to be positioned below the drink holder 104.

FIG. 3B is a cross-sectional view taken along A-A in FIG. 3A. FIG. 3B shows the floor panel 102 in the vicinity of the center tunnel, as a region in which the console box 100 is installed. As shown in FIG. 3B, the link portion 124 includes portions with different heights. First, two end portions 126a and 126b in the longitudinal direction of the link portion 124 are formed low so as to be in contact with the floor panel 102. The two end portions 126a and 126b have bolt holes 128a and 128b, and are fixed to the floor panel 102 with bolts 130a and 130b (first fixing portion). Note that the member that fixes the link portion 124 to the floor panel 102 is not limited to the bolts 130a and 130b, and clips or the like may also be used.

A center portion 132 in the longitudinal direction of the link portion 124 is formed high so as to be at a distance from the floor panel 102. The center portion 132 has a clip hole 134. Furthermore, in this embodiment, a lower face 136 at the bottom of the drink holder 104 has a clip 138 as a connecting portion, and the clip 138 is configured so as to be connected to the clip hole 134 of the link portion 124.

Figure 4A:
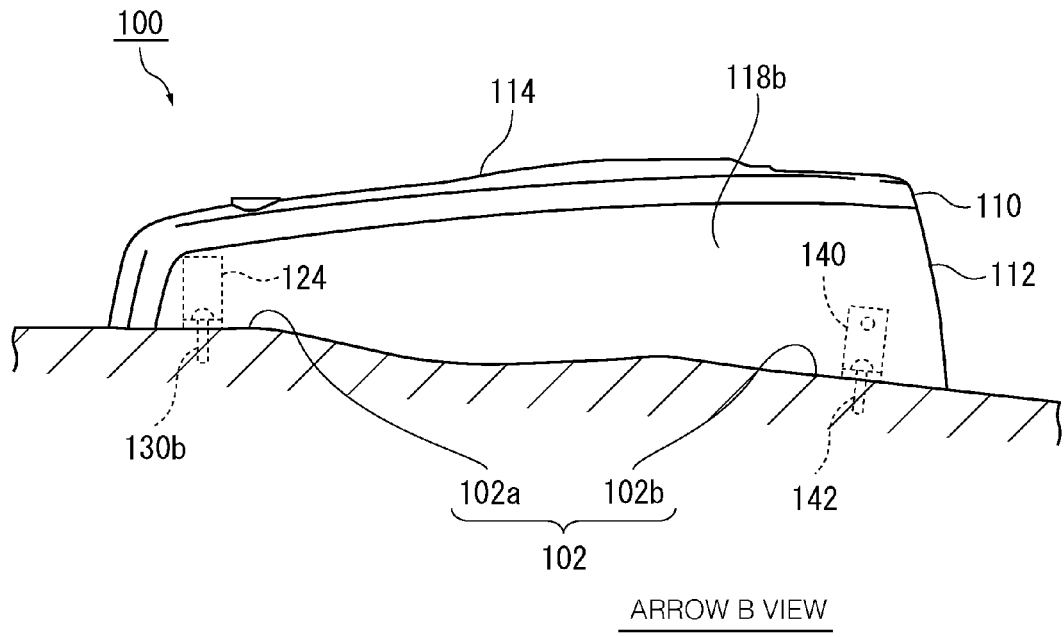
FIGS. 4A and 4B show views of the console box in FIG. 3B from different directions.
Figure 4B:
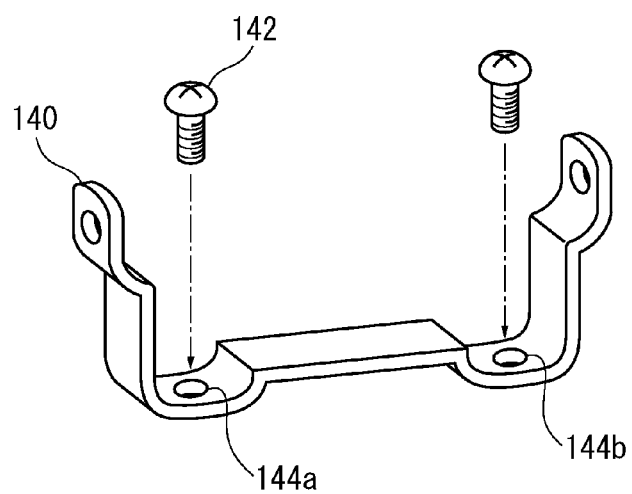

In this embodiment, also the installation location of the console box 100 has been modified. FIGS. 4A and 4B show views of the console box 100 in FIG. 3B from different directions. FIG. 4A is a view showing FIG. 3B in the arrow B direction. As shown in FIG. 4A, in this embodiment, the console box 100 is installed on the floor panel 102 over a location having a difference in height between the front and the rear in the vehicle. For example, the floor panel 102 has a front region 102a that is high, and a rear region 102b that is lower than the front region 102a. The link portion 124 described above is fixed to the front region 102a. Furthermore, the lower component 112 is further fixed on the rear side with bolts 142 via a bracket 140 to the rear region 102b at a position lower than the link portion 124 (second fixing portion). As shown in FIG. 4B, the bracket 140 has bolt holes 144 for passing the bolts 142, and can be attached to the side walls 118a and 118b of FIG. 4A.

In this manner, the console box 100 can be installed on the floor panel 102 over a location having a difference in height. Accordingly, compared with the case in which the console box 100 is installed in a flat location, the attachment rigidity can be improved against loads that may be applied by an occupant, in particular, loads that would rotate the console box 100. Note that the member that attaches the lower component 112 to the rear region 102b is not limited to the bolts 142, and clips or the like may also be used. Furthermore, it is not absolutely necessary to use the bracket 140 of FIG. 4B, and, for example, it is possible to provide a catch structure on the lower edges of the side walls 118a and 118b, and to use this catch structure to attach the side walls 118a and 118b to the rear region 102b.

With the above-described configuration, the console box 100 can efficiently absorb loads that may be applied by an occupant, and, thus, a defective appearance such as deformation can be prevented from occurring. Furthermore, this configuration can improve the rigidity without providing an additional member, and, thus, can contribute to lowering the cost.

Second Embodiment

Figure 5A:
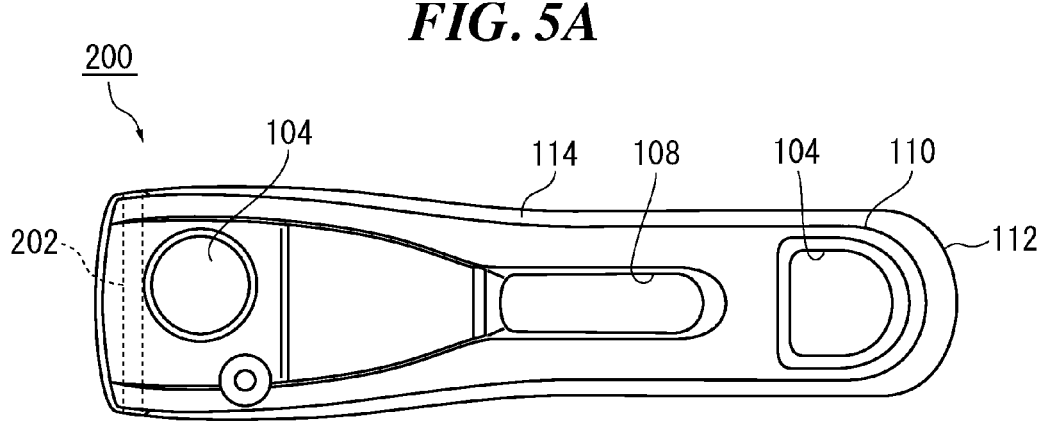
FIGS. 5A and 5B show views of a console box according to a second embodiment of the present invention.
Figure 5B:
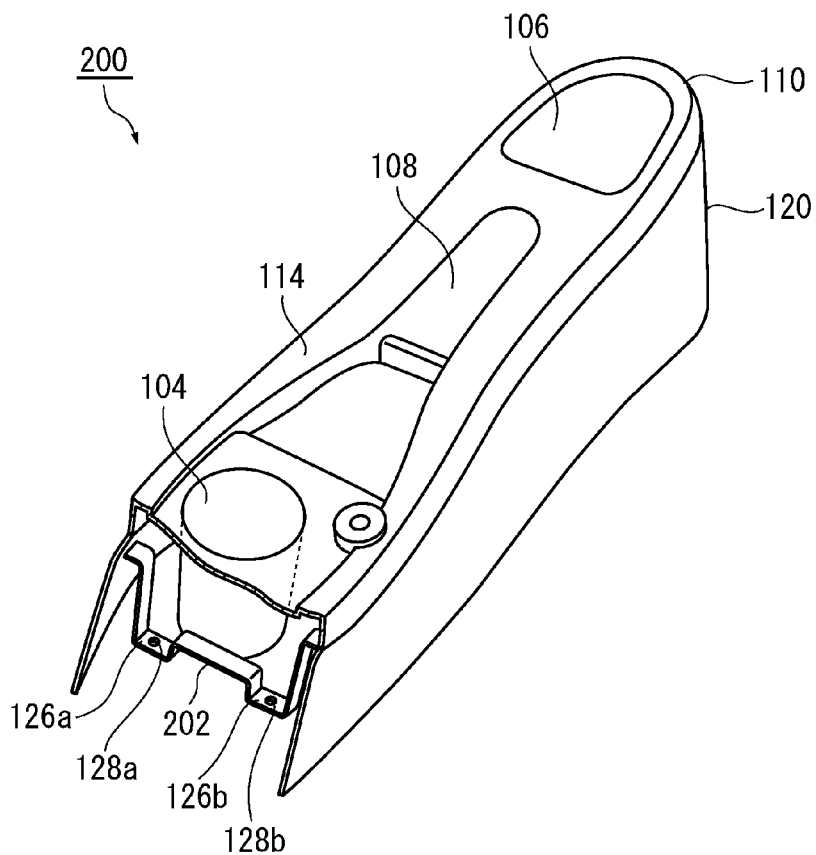

FIGS. 5A and 5B show views of a console box 200 according to a second embodiment of the present invention. FIG. 5A is a view showing the console box 200 from above. The console box 200 is different from the console box 100 shown in FIG. 3A etc., in that a link portion 202 is provided so as to be in contact with the side portion of the drink holder 104.

FIG. 5B is a cut-away perspective view showing the internal portion of the console box 200 in FIG. 5A as an example. As shown in FIG. 5B, the link portion 202 is in contact with the drink holder 104, and, thus, even when loads are applied to the upper component 110, the link portion 202 presses the drink holder 104, thereby preventing the upper component 110 from being moved. This configuration can improve the rigidity of the console box 200 against loads that may be applied by an occupant, and, thus, a defective appearance such as deformation can be prevented from occurring.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The present invention is applicable to console boxes installed on a floor panel between the front seats of a vehicle, for example.

What is claimed is:

1. A console box that can be installed on a floor panel of a vehicle, that is made of resin, and that is elongate in a vehicle front-rear direction, comprising:
    an upper component forming a top face and a front wall on the vehicle front side, and having, in the top face near the front wall, a container portion that is recessed downward; and
    a lower component forming side walls on both sides in a vehicle width direction and a rear wall on the vehicle rear side;
    wherein the lower component has a link portion that extends between and links inner faces of the side walls below the container portion,
    the link portion has a first fixing portion that fixes the link portion to the floor panel, and
    a lower face at a bottom of the container portion has a connecting portion that connects the container portion to the link portion;
    wherein the lower component further has a second fixing portion that fixes the lower component to the floor panel at a position lower than the link portion; and
    wherein the console box is configured to be installed on the floor panel, over a location in which height differs between the front and the rear in the vehicle and in which a rear region is lower than a front region.

2. A console box that can be installed on a floor panel of a vehicle, that is made of resin, and that is elongate in a vehicle front-rear direction, comprising:
    an upper component forming a top face and a front wall on the vehicle front side, and having, in the top face near the front wall, a container portion that is recessed downward; and
    a lower component forming side walls on both sides in a vehicle width direction and a rear wall on the vehicle rear side;
    wherein the lower component has a link portion that extends between and links inner faces of the side walls, and
    at least a part of the link portion is in contact with a side portion of the container portion, and the link portion has a first fixing portion that fixes the link portion to the floor panel.

3. The console box according to claim 2, wherein:
    the lower component further has a second fixing portion that fixes the lower component to the floor panel at a position lower than the link portion; and
    the console box is configured to be installed on the floor panel, over a location in which height differs between the front and the rear in the vehicle and in which a rear region is lower than a front region.

* * * * *